(12) United States Patent
Cwielag

(10) Patent No.: US 11,583,818 B2
(45) Date of Patent: Feb. 21, 2023

(54) COMBUSTOR AIR BAR GRID FOR USE WITHIN A FLUIDIZED BED REACTOR, AND A FLUIDIZED BED REACTOR

(71) Applicant: SUMITOMO SHI FW ENERGIA OY, Espoo (FI)

(72) Inventor: Jan Cwielag, Tarnowskie Gory (PL)

(73) Assignee: SUMITOMO SHI FW ENERGIA OY, Espoo (FI)

( * ) Notice: Subject to any disclaimer, the term of this patent is extended or adjusted under 35 U.S.C. 154(b) by 0 days.

(21) Appl. No.: 17/291,748

(22) PCT Filed: Nov. 7, 2018

(86) PCT No.: PCT/EP2018/080483
§ 371 (c)(1),
(2) Date: May 6, 2021

(87) PCT Pub. No.: WO2020/094224
PCT Pub. Date: May 14, 2020

(65) Prior Publication Data
US 2022/0023816 A1  Jan. 27, 2022

(51) Int. Cl.
*B01J 8/00* (2006.01)
*B01J 8/18* (2006.01)
(Continued)

(52) U.S. Cl.
CPC .............. *B01J 8/44* (2013.01); *B01J 8/1836* (2013.01); *F23C 10/20* (2013.01); *F27B 15/10* (2013.01);
(Continued)

(58) Field of Classification Search
CPC ..... B01J 8/00; B01J 8/18; B01J 8/1836; B01J 8/24; B01J 8/44; B01J 2208/00;
(Continued)

(56) References Cited

U.S. PATENT DOCUMENTS

| 4,330,143 A | 5/1982 | Reneau |
| 4,382,415 A | 5/1983 | Korenberg |

(Continued)

FOREIGN PATENT DOCUMENTS

| JP | 2004116797 A | 4/2004 |
| KR | 20090132934 A | 12/2009 |

(Continued)

OTHER PUBLICATIONS

The Babcock & Wilcox Company, "Bubling Fluidized-Bed Boilers, Burning Biomass and Low-Cost Fuels, Clean, Efficient, Reliable and Easy to Operate", Date unknown.

(Continued)

*Primary Examiner* — Natasha E Young
(74) *Attorney, Agent, or Firm* — Venable LLP

(57) ABSTRACT

A combustor air bar grid for use within a fluidized bed reactor includes at least two main air collector bars in fluid communication with a source of fluidizing gas, a plurality of primary air bars that are transversal to the main air collector bars and arranged on the at least two main air collector bars such that the main air collector bars support them, and in fluid communication to at least two of the main air collector bars. The main air collector bars and the primary air bars define ash removal openings in the air bar grid and a plurality of fluidized nozzles are arranged to each of the primary air bars for fluidizing the bed reactor. A fluidized bed reactor includes such a combustor air bar grid.

26 Claims, 3 Drawing Sheets

(51) Int. Cl.
  *B01J 8/24* (2006.01)
  *B01J 8/44* (2006.01)
  *F23C 10/20* (2006.01)
  *F27B 15/10* (2006.01)
  *F27B 15/16* (2006.01)
  *F27D 9/00* (2006.01)

(52) U.S. Cl.
  CPC ..... *F27B 15/16* (2013.01); *B01J 2208/00504* (2013.01); *B01J 2208/00902* (2013.01); *F27D 2009/0005* (2013.01)

(58) Field of Classification Search
  CPC .... B01J 2208/00008; B01J 2208/00017; B01J 2208/00504; B01J 2208/00796; B01J 2208/00893; B01J 2208/00902; F23C 10/00; F23C 10/02; F23C 10/04; F23C 10/18; F23C 10/20; F23C 10/24; F23C 2900/00; F23C 2900/10007; F27B 15/00; F27B 15/02; F27B 15/10; F27B 15/16; F27D 2009/00; F27D 2009/0002; F27D 2009/0005
  See application file for complete search history.

(56) References Cited

U.S. PATENT DOCUMENTS

| | | | |
|---|---|---|---|
| 4,402,665 A | 9/1983 | Korenberg | |
| 4,606,135 A | 8/1986 | Morin | |
| 5,368,824 A | 11/1994 | Nell et al. | |
| 5,425,331 A | 6/1995 | Abdulally | |
| 5,743,197 A | 4/1998 | Kinni et al. | |
| 6,263,837 B1 | 7/2001 | Utunen et al. | |
| 6,782,848 B2 | 8/2004 | Kinni | |
| 8,516,968 B2 * | 8/2013 | Pope | F23G 5/30 110/165 R |
| 2003/0170582 A1 | 9/2003 | Kinni | |
| 2014/0152904 A1 | 6/2014 | McDowall et al. | |

FOREIGN PATENT DOCUMENTS

| | | |
|---|---|---|
| SU | 1149105 A1 | 4/1985 |
| SU | 1149105 A1 | 7/1985 |
| SU | 1617250 A1 | 12/1990 |
| WO | 2018044178 A1 | 8/2018 |

OTHER PUBLICATIONS

Notification of and International Search Report and Written Opinion dated Jul. 8, 2019, in corresponding International Patent Application No. PCT/EP2018/080483.
Notification of and International Preliminary Report on Patentability dated Jul. 7, 2020, in corresponding International Patent Application No. PCT/EP2018/080483.
Search Report dated Nov. 8, 2021, in Russian Application No. 2021115267.
Decision to Grant dated Nov. 15, 2021, in Russian Application No. 2021115267.
Examination Report dated Dec. 10, 2021, in Australian Application No. 2018448673.
Japanese Office Action, issued in corresponding Japanese Patent Application No. JP 2021-523339, dated May 30, 2022.
Substantive Examination Result in corresponding Saudi Patent Application No. 206/22061, dated Jun. 30, 2022.
Substantive Examination Result in corresponding Indonesian Patent Application No. P00202104040, dated Aug. 8, 2022.
Substantive Examination Result in corresponding Saudi Patent Application No. 521421880 dated Jun. 30, 2022.
Brazilian Office Action dated Sep. 7, 2022, in corresponding Patent Application No. BR112021008836-9 (8 pages).
Saudi Office Action dated Sep. 27, 2022, in corresponding Patent Application No. 521421880 (7 pages).
Korean Office Action dated Sep. 29, 2022, in corresponding Patent Application No. 10-2021-7015620 (11 pages).
Japanese Office Action dated Oct. 7, 2022, in corresponding Patent Application No. 2021-523339 (8 pages).

* cited by examiner

COMBUSTOR AIR BAR GRID FOR USE WITHIN A FLUIDIZED BED REACTOR, AND A FLUIDIZED BED REACTOR

CLAIM OF PRIORITY

This application is a U.S. national stage application of International Patent Application No. PCT/EP2018/080483, filed Nov. 7, 2018, now published as International Publication No. WO 2020/094224 A1 on May 14, 2020.

FIELD OF THE INVENTION

The invention relates to an improved combustor air bar grid, and more particularly, to fluidized bed reactors, such as for combustion of solid materials, including biomass, or incineration of waste fuels containing non-combustible material, and for the removal of ash or non-combustible material during combustion or incineration.

TECHNICAL BACKGROUND

Chemical reactions, such as combustion or gasification, are performed in a fluidized bed material layer of fluidized bed reactors, usually, so-called bubbling fluidized bed or circulating fluidized bed reactors. There, fluidizing gas, for example, air, is supplied in the reactor through the bed material layer, mainly comprising sand and fuel, in such a way that the bed turns to an easily moving fluidized state. However, in a fluidized bed reactor, material combusted is non-uniform and may be subject either to agglomeration or to having non-combustible material entrained.

Combustor air bar grids have been designed to allow air to flow up through the burning bed of material and to allow ash and non-combustible material to be removed from the bottom of the bed. The ash and non-combustible material, as well as bed material, pass through the spaces between the bars. This type of grate may have an air manifold that distributes air to individual bars connected to the manifold. Each air bar has air nozzles for dispersing fluidizing air into the bed material.

U.S. Pat. No. 4,402,665 discloses an air bar grid for use within a fluidized bed reactor. The air bar grid comprises a main air collector in fluid communication with a source of pressurized air, and a grid of primary air bars perpendicular to the main air collector. Each of the primary air bars has an upper surface and is connected along its length for fluid communication with the main air collector. Intermediate air bars are arranged parallel to the main air collector and perpendicular to each of the primary air bars. The intermediate and primary air bars lie in the same plane and intersect each other at right angles.

U.S. Pat. No. 5,743,197 discloses a grate assembly for a fluidized bed boiler having a water, steam, or air cooled sparge pipe grate. The cooled sparge pipes are supported at their ends by the pipes conducting water, steam, or air. The sparge pipes are mounted side by side in such a manner that between the adjacent sparge pipes remains a horizontal aperture extending in the longitudinal direction of the sparge pipes.

U.S. Pat. No. 5,425,331 discloses a fluidized bed reactor having hollow spaced air bars disposed in the lower portion of the boiler for supporting a bed of particulate material including fuel and incombustible solids. The air bars are supported in the lower portion of the reactor by a plurality of water-cooled support tubes that continually transfer heat from the air bars to the water flowing in the pipes. The air bars extend perpendicular to, and in air flow communication with, a plenum chamber disposed externally of the hopper and adjacent the wall. Pressurized air is introduced into the chamber by conventional means.

Korean Patent Document No. 2009/132934 A discloses an air distributor system for a refuse derived fuel combustion system including a fluidized bed. The air distributor system comprises air supply pipes, a nozzle, and cooling water pipes. The air supply pipes are connected to air distributors in longitudinal and traverse directions. The air supply pipes comprise a nozzle connector in which a plurality of air supply ports are installed. The cooling water pipes are installed on the exterior of the air supply pipes and supply cooling water to prevent thermal corrosion of the air supply pipes.

U.S. Pat. No. 5,368,824 discloses a gas distribution system employing an array of parallel gas inlet pipes and a pair of transverse gas inlet pipes located below the first group of pipes to fluidize a particulate bed in a reaction vessel and to remove non-fluidizable particles that may be introduced into or form in the bed.

Soviet Union Patent Document No. 1149105 discloses a furnace of a fluidized bed containing a combustion chamber with an air box placed underneath it, in which an ash hopper is installed. In the upper part of the ash hopper are air supply pipes connected to the box cavity by their ends, and one pipe connected to the cavity of the air supply pipes and the cavity of the air box.

U.S. Patent Application Publication No. 2003/170582 A1 discloses a pipe grate for a fluidized bed boiler. Air is supplied to the fluidized bed boiler through several pipes. The active area of the grate, in which the supply of air, or the like, to the pipe grate takes place, is adjusted with pipe-specific control means that are included in at least some of the pipes of the pipe grate.

Objective of the Invention

An objective of the invention is to improve ash and non-combustible material collection in a fluidized bed reactor. A second objective of the invention is to enable having a more homogeneous flow distribution of the fluidizing gas in the bed. Both objectives can be met with a combustor air bar grid of the present invention.

Advantages of the Invention

A combustor air bar grid for use within a fluidized bed reactor comprises at least two main air collector bars in fluid communication with a source of pressurized fluidizing gas (such as air), and a plurality of primary air bars that are transverse to the main air collector bars and arranged on the at least two main air collector bars such that the main air collector bars support them, and in fluid communication to at least two of the main air collector bars. The main air collector bars and the primary air bars define ash removal openings in the air bar grid. The combustor air bar grid further comprises a plurality of fluidizing nozzles arranged to each of the primary air bars for fluidizing the bed reactor.

Compared with the combustor air bar grid known from U.S. Pat. No. 4,402,665, the structure of the fluidized bed reactor may be simplified by having pressurized fluidizing gas enter the primary air bars from at least two of the main air collector bars, that is, from different locations along the primary air bars. On one hand, this enables having a more uniform pressure distribution of the pressurized fluidizing gas within the primary air bars along their length. On still the other hand, the main air collector bars also function as supporting beams for the primary air bars and, in this manner, enable grid modular design. Further, the air feeding ducts are at the same time working as supporting beams and enable grid modular design.

Furthermore, and also compared with the grate bar assemblies known from U.S. Pat. Nos. 5,743,197 and 5,425,331, the structure of the fluidized bed reactor may be simplified by having the same medium flowing in the two main air collector bars that support the primary air bars as in the primary air bars. Thus, the supply for the medium entering into the fluidized bed reactor may be implemented in a more compact manner.

The pressurized fluidizing gas cools not only the primary air bars, but also, main air collector bars, keeping them in an adequate temperature range, thus helping to ensure that the primary air bars and the main air collector bars do not soften too much. By suitably dimensioning the main air collector bars and the separation between neighboring main air collector bars, the weakening of the combustor air bed grid caused by softening of the primary air bars can be alleviated. A further advantage is that the main air collector bars are cooled by air that helps to simplify the mechanical design of the reactor, since the structures for water cooling of the main air collector bars may be omitted.

At the simplest, the main air collector bars are in fluid communication with the primary air bars via fluidizing gas transmit openings made in the upper side of each collector bar and in the bottom side of each primary air bar that overlap with each other. Particularly preferably, the fluidizing gas transmit openings are made as cut-outs in the opposing faces of each of the main air collector bars and primary air bars at the location of their intersection, both bars having a rectangular cross section. In this manner, the weakening of the structure by the cut-outs can be kept relatively small, especially, if compared with the deep cuts in the air duct having a circular cross section as known from U.S. Pat. No. 4,402,665.

The combustor air bar grid may further comprise a number of support beams or support bars arranged to support the main air collector bars. In this manner, the weight of the bed can be essentially supported by the support beams or support bars, enabling the simplifying of the mechanical construction of the fluidized bed reactor.

The combustor air bar grid further comprises a number of ash hoppers arranged beneath the ash removal openings formed by the main air collector bars and primary air bars. This enables an effective collection of ash and non-combustible material from the bed.

Preferably, the upper portions of the ash hoppers are laterally aligned with and in mechanical contact to the main air collector bars. According to an embodiment of the invention, the upper portion of the ash hopper has an upper section having a rectangular horizontal cross section, and two opposite sides of the upper portion of the ash hopper have been attached to be in mechanical contact with respective main air collector bars, by welding the upmost portion of the ash hopper funnel to the main air collector bars, for example. The main air collector bars thus form air-cooled external walls for the ash hoppers.

Furthermore, the main air collector bars create a wind box that may be connected with the boiler pressure parts using at least one expansion joint. Therefore, the lower part of the ash hoppers can be made conical, without needing to use a cooled plate design. The whole weight of fluidized bed and bottom ash can be transferred from distribution beams on main air collector bars and primary air bars (that preferably are welded plate beams) to the grid supporting structure.

The connection of the main air collector bars to the boiler pressure parts by using at least one expansion joint helps to accommodate for thermal expansion.

The main air collector bars are configured to form external air-cooled walls for the ash hoppers that are cooled with the pressurized fluidizing gas. In this manner, the pressurized fluidizing gas from the main air collector bars can be used also to remove heat from the ash hoppers. In this way, the need to use air- or water-cooled plates in the ash hoppers can be avoided.

Preferably, the at least two main air collector bars and the plurality of the primary air bars are hollow beams of metal forming conduits for the fluidizing gas.

The combustor air bar grid may be constructed as a modular combustor air bar grid consisting of a number of modules, such that in the modules the main air collector bars have a length allowed for normal rail or road transport or for an abnormal or oversize load, preferably between 2.5 and 4 meters, most preferably, between 2.5/2.55/2.60 and 3.50 meters. Such a combustor air bar grid is easier to transport to the site for installation.

According to another advantageous aspect, the main air collector bars may consist of segments composed of modules joined together. This enables a modular way of constructing the fluidized bed reactor in a modular manner. Particularly, the modules each may have a length allowed for normal road transport or for an abnormal or oversize load, preferably between 2.5 and 4 meters, most preferably between 2.5/2.55/2.60 and 3.50 meters.

A fluidized bed reactor comprises a furnace having a combustor air bar grid according to the first aspect of the invention.

BRIEF DESCRIPTION OF THE DRAWINGS

In the following, the combustor air bar grid and the fluidized bed reactor are explained in more detail with reference to the exemplary embodiments shown in FIGS. 1 to 4, of which.

The same reference numerals refer to the same technical features in all figures.

DETAILED DESCRIPTION

Figure 1:
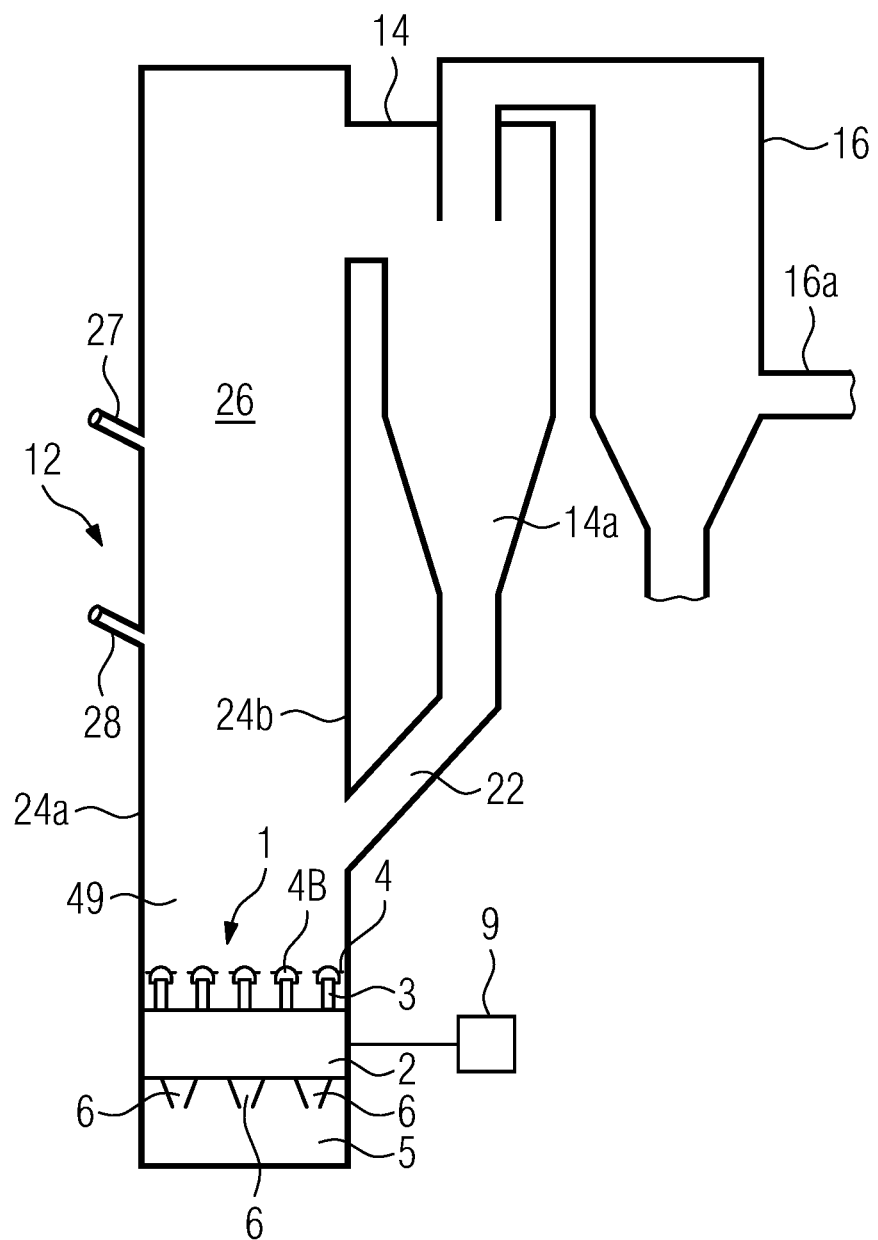
FIG. 1 shows a steam generator system comprising a circulating fluidized bed reactor.

FIG. 1 shows a steam generating system 10. The structure and operation of the steam generating system 10 may be, up to the combustor air grid 1, the ash hoppers 6 and the support structures, identical to the steam generating system 10 disclosed in U.S. Pat. No. 5,425,331, which is hereby incorporated by reference.

The steam generating system 10 includes a fluidized bed reactor 12 (which in FIG. 1 is illustrated as a circulating fluidized bed reactor and in FIG. 4 as a bubbling fluidized bed reactor), a cyclone separator 14, and a heat recovery area 16.

An air bar grid 1 is provided in the lower portion of the fluidized bed reactor 12 and will be described in detail below with reference to the embodiments shown in FIGS. 2 and 3.

The cyclone separator 14 receives a mixture of air and the gaseous products of combustion from the fluidized bed reactor 12 along with solid particles entrained thereby. The separator 14 operates to separate the solids from the gases, and the latter are passed to the heat recovery area 16. The solids from the separator 14 fall down into a tapering section 14a of the separator where they are reinjected, via a return leg 22, to the lower portion of the reactor section 12. The gases, after passing through the heat recovery area 16, exit via an outlet conduit 16a.

The fluidized bed reactor 12 includes a front wall 24a, a spaced, parallel rear wall 24b, and two spaced, parallel side walls (not shown in FIG. 1), which extend perpendicular to the front and rear walls to form an enclosure.

At least one distributor 27 extending through the front wall 24a, back wall 24b, or side walls, for introducing fuel into the fluidized bed can be used to feed fuel into the fluidized bed reactor 12, as shown in FIG. 1. Alternatively, or in addition, feeding of the fuel can be carried out with a silo-hopper and a screw-feeder that are disposed above the fluidized bed reactor 12 and register with an opening formed in its roof for introducing biomass or waste fuels, such as municipal refuse, onto the upper surface of a fluidized bed disposed above the combustor air bar grid 1. The waste fuel may contain non-combustible material, such as bottles and cans.

A distributor 28 extends through the front wall 24a for introducing bed make-up material onto the upper surface of the fluidized bed. This make-up material consists, in general, of sand and/or limestone, or dolomite, for adsorbing the sulphur oxides released during the combustion of the waste fuel. It is understood that other distributors can be associated with the walls 24a, 24b and any or both of the side walls, for distributing bed make-up material onto the bed, as needed.

In the operation of the steam generator 10, a quantity of biomass or waste fuel and bed make-up material are introduced through the screw feeder 27 and the distributor 28, respectively, and build up on the upper surface of the air grid 1. Fluidizing gas preferably, air from an external source is supplied to the plenum chamber 49 at a sufficient volume by a fluidizing gas source 9. Preferably, combustion fluidized air is used as the fluidizing gas. The pressurized fluidizing gas causes the bed make-up material above the combustor air bar grid 1 to become fluidized in the furnace 26. Burners (not shown) are disposed in the plenum chamber 49 to raise the temperature of the fluidizing gas to a temperature sufficient to commence the burning of the biomass or waste fuel material disposed above the combustor air bar grid 1. Auxiliary fuel, such as coal, may be provided by the distributor 28 in the event that the biomass or waste fuel has a low calorie content. Once the biomass or waste fuel inside the reactor 12 starts burning with the fluidizing gas, ignition by the burners and/or the auxiliary fuel is reduced or ceased as needed.

As the combustion progresses, additional waste fuel and bed make-up material are introduced through the screw feeder 27 and the distributor 28, respectively, to the fluidized bed reactor 12. The non-combustible material, ash and spent bed make-up material, are gravitationally and pneumatically transported downwardly as the fluidizing gas and the products of combustion move upwardly within the fluidized bed reactor 12. The incombustible solids move downwardly through the fluidized bed reactor 12 to the upper surface of the combustor air bar grid 1, pass downwardly through the combustor air bar grid 1 through the openings in the air bar grid 1, and continue to descend within the ash hoppers 6 as heat is transferred by convection from the bed material by fluidizing gas streaming from air nozzles or pipes with air from the primary air bars, thus, air cooling the external walls of the ash hoppers 6. The incombustible solids exit the hoppers 6 though an opening in the base of the hopper and are removed by a worm screw, for example. A portion of the incombustible solids are subsequently screened to remove the non-combustible material and any agglomerations that can form during the combustion of the waste fuel and returned to the fluidized bed within the fluidized bed reactor 12 at a rate required to maintain the inventory of the bed make-up material.

The combustor air bar grid 1 comprises a number of (generally, at least two, but three, four, five, . . . , are possible) main air collector bars 2 in fluid communication with a source 9 of pressurized fluidizing gas. In this manner, the distribution of the fluidizing gas can be made more uniform.

The combustor air bar grid further comprises a plurality of primary air bars 3 that are transverse to the main air collector bars 2 and arranged on the at least two main air collector bars 2 such that the main air collector bars 2 support them, and in fluid communication to at least two of the main air collector bars 2, and a plurality of fluidizing nozzles 4 arranged to each of the primary air bars 3 for fluidizing the fluidized bed reactor 12. The fluidizing nozzles 4 may be arranged on central air conduits 4B located on each of the primary air bars 3, or directly on primary air bars 3.

The main air collector bars 2 are in fluid communication with the primary air bars 3 via openings between the collector bars 2 and the primary air bars 3. The openings are preferably manufactured before installing the primary air bars 3 on the main air collector bars 2 such that the openings have been made (such as by cutting or laser cutting) at overlapping locations at the primary air bars 3 and the main air collector bars 2.

The main air collector bars 2 create a wind box that is connected with boiler pressure parts using at least one expansion joint.

The combustor air bar grid 1 may further comprise a number of support beams or support bars 5 arranged to support the main air collector bars 2 such that the support beam or support bars 5 form a frame structure, in which, preferably, the support bars 5 are arranged as vertical pillars directly under the main air collector bars, optionally, with an essentially horizontal frame structure 5c.

The whole weight of fluidized bed and bottom ash may be transferred from the primary air bars via the main air collector beams (that can be realized as welded plate beams) to the grid supporting structure.

The combustor air bar grid 1 comprises a number of ash hoppers 6 arranged beneath the ash removal openings defined by the main air collector bars 2 and primary air bars 3. Preferably, the ash hoppers 6 are laterally aligned with and in mechanical contact with the main air collector bars 2.

During the descent of the spent bed material through the plenum, heat is continuously transferred from the bed material to the water flowing through the tubes forming the reactor walls (front wall 24a, rear wall 24b, and side walls), and the ash hopper 6 walls. The main air collector bars 2 form air-cooled external walls for the ash hoppers 6. Thus, the ash hoppers 6 do not necessarily need to be water-cooled. The lower part of the ash hoppers 6 may thus be made conical and without employing the cooled plate design.

Then, preferably, the main air collector bars 2 are configured to air cool the ash hoppers 6 with the pressurized fluidizing gas from the main air collector bars 2, most preferably, via air nozzles or pipes.

The at least two main air collector bars 2 and the primary air bars 3 are preferably beams of metal, forming conduits for the fluidizing gas.

The combustor air bar grid 1 may be constructed as a modular combustor air bar grid consisting of a number of modules 7, such that in the modules 7 the main air collector bars 2 have a length allowed for normal road transport or for an abnormal or oversize load, preferably, between 2.5 and 4 meters, most preferably between 2.50/2.55/2.60 and 3.50 meters, the maximum allowed dimensions currently varying in each country.

Alternatively, or, in addition to this, the main air collector bars 2 may consist of segments composed of modules 7 joined together. The modules 7 each may have a length allowed for normal road transport or for an abnormal or oversize load, preferably, between 2.5 and 4 meters, most preferably between 2.5/2.55/2.60 and 3.5 meters.

Figure 2:
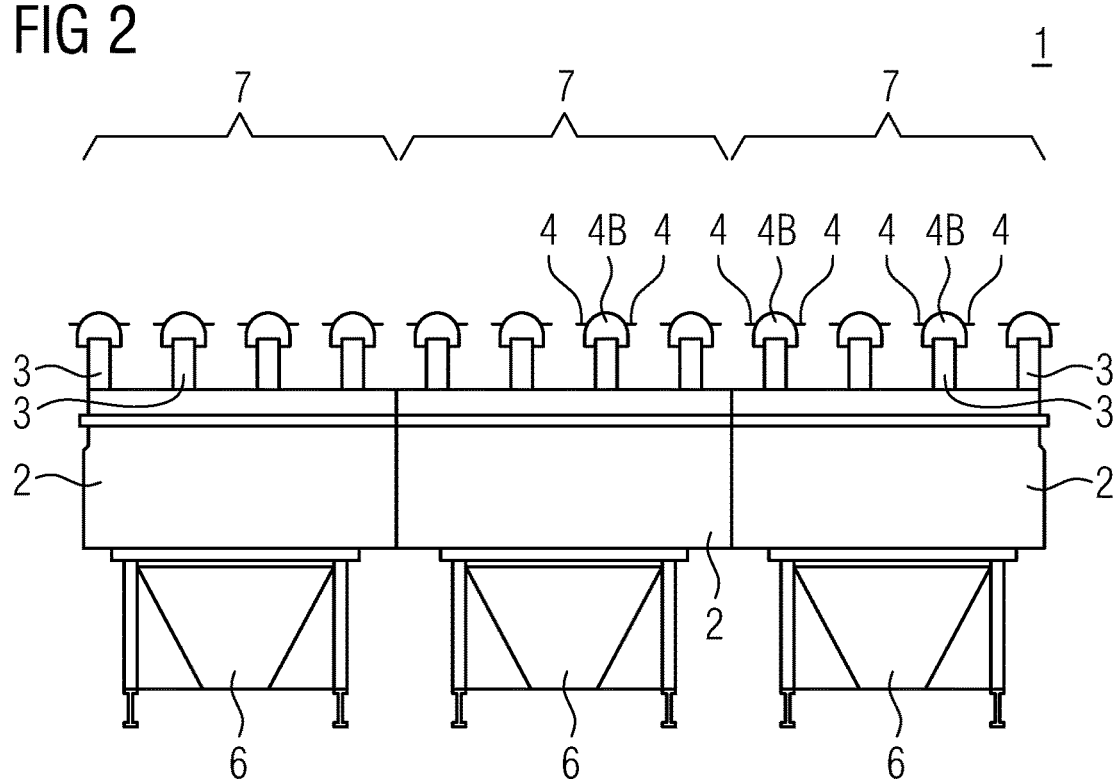
FIG. 2 is a lateral view of a combustor air bar grid.
Figure 3:
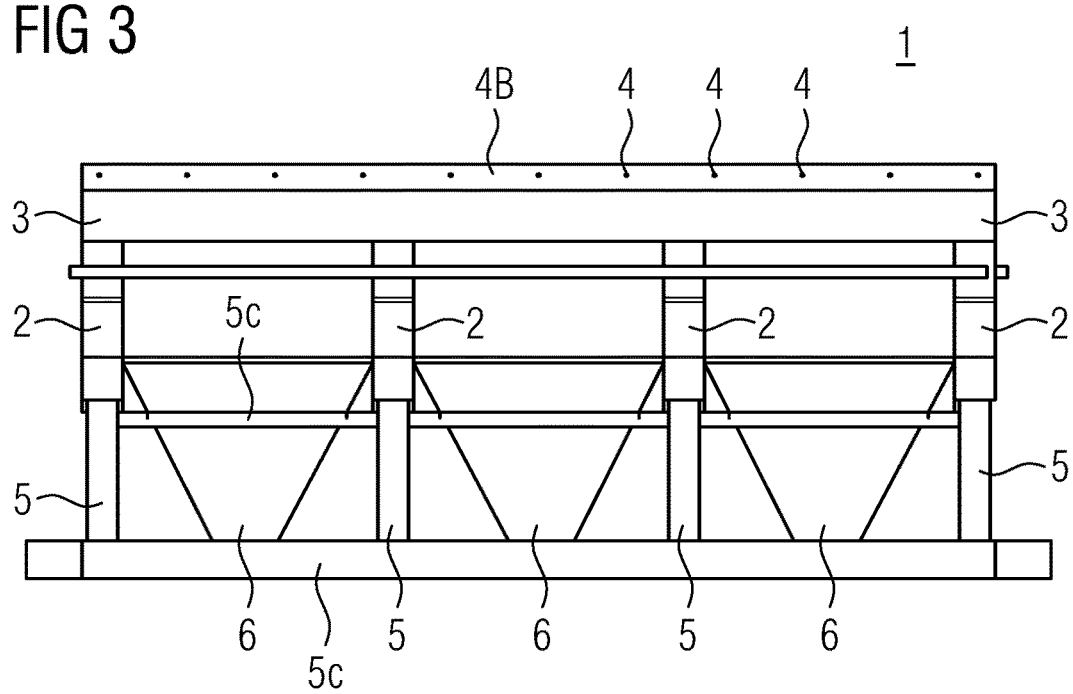
FIG. 3 is an end view of the combustor air bar grid of FIG. 2.
Figure 4:
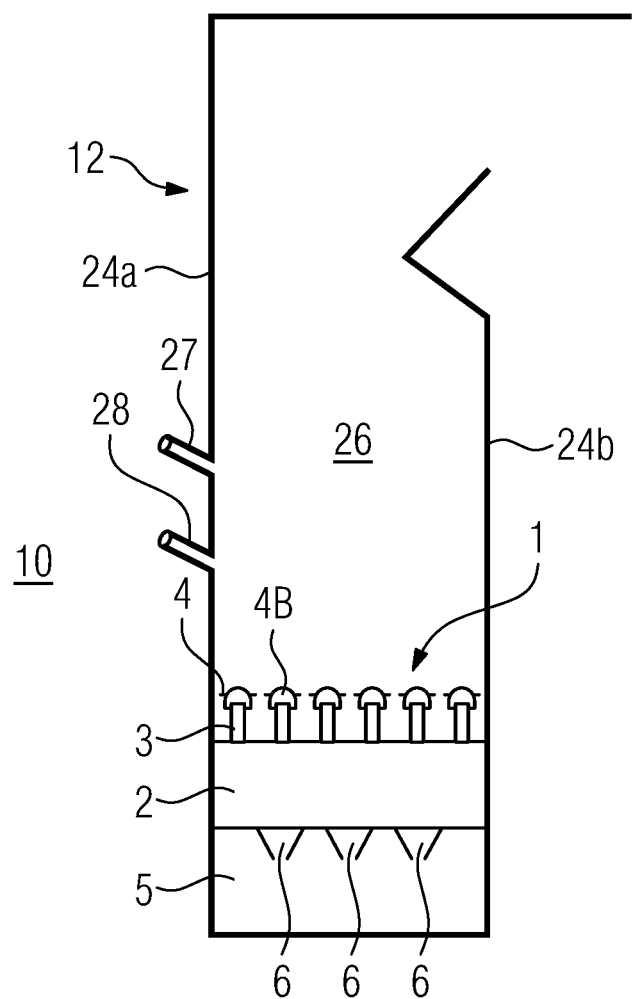
FIG. 4 is a bubbling fluidized bed reactor boiler with the combustor air grid according to the invention.

FIG. 1 shows a steam generator system 10 that has a circulating fluidized bed reactor as its fluidized bed reactor 12, and FIGS. 2 and 3 illustrate the combustor air bar grid 1 located within the circulating fluidized bed reactor. Alternatively, the combustor air bar grid 1 can be located within a bubbling fluidized bed reactor as shown in FIG. 4.

It is obvious to the skilled person that, along with the technical progress, the basic idea of the invention can be implemented in many ways. The invention and its embodiments are thus not limited to the examples described above, but they may vary within the contents of patent claims and their legal equivalents.

While the invention has been described herein by way of examples in connection with what are at present considered to be the most preferred embodiments, it is to be understood that the invention is not limited to the disclosed embodiments, but is intended to cover various combinations or modifications of its features and several other applications included within the scope of the invention as defined in the appended claims.

The invention claimed is:

1. A combustor air bar grid for use within a fluidized bed reactor, the combustor air bar grid comprising:
    at least two main air collector bars in fluid communication with a source of fluidizing gas;
    a plurality of primary air bars that are transverse to the main air collector bars and arranged on the at least two main air collector bars such that the main air collector bars support the plurality of primary air bars, the plurality of primary air bars being in fluid communication with at least two of the main air collector bars, and the main air collector bars and the primary air bars defining ash removal openings in the air bar grid;
    a plurality of fluidizing nozzles arranged to each of the primary air bars for fluidizing the bed reactor; and
    a number of ash hoppers arranged beneath the ash removal openings,
    wherein the main air collector bars are configured to form external air-cooled walls for the ash hoppers that are cooled with the fluidizing gas.

2. The combustor air bar grid according to claim 1, wherein the main air collector bars are in fluid communication with the primary air bars via fluidizing gas transmitting openings formed in an upper side of each collector bar and in a bottom side of each primary air bar that overlap with each other.

3. The combustor air bar grid according to claim 1, further comprising a number of support beams or support bars arranged to support the main air collector bars, of which vertical support beams or bars are arranged directly below the main air collector bars.

4. The combustor air bar grid according to claim 3, further comprising an essentially horizontal frame structure.

5. The combustor air bar grid according to claim 1, wherein the ash hoppers have upper parts that are laterally aligned with and in mechanical contact with the main air collector bars.

6. The combustor air bar grid according to claim 1, wherein the main air collector bars are connected to boiler pressure parts by using at least one expansion joint.

7. The combustor air bar grid according to claim 1, wherein the at least two main air collector bars and the plurality of the primary air bars are hollow beams of metal, forming conduits for the fluidizing gas.

8. The combustor air bar grid according to claim 1, wherein the main air collector bars and the primary air bars comprise a hollow passageway for the pressurized fluidizing gas.

9. The combustor air bar grid according to claim 1, wherein the combustor air bar grid is constructed as a modular combustor air bar grid comprising a number of modules, such that, in the modules, the main air collector bars have a length allowed for normal rail or road transport, or for an abnormal or an oversize load, between 2.5 and 4 meters.

10. The combustor air bar grid according to claim 9, wherein the main air collector bars comprise segments composed of modules joined together by welding.

11. The combustor air bar grid according to claim 10, wherein each of the modules has a length allowed for normal road transport, or for an abnormal or an oversize load, between 2.50 and 3.50 meters.

12. The combustor air bar grid according to claim 11, wherein the combustor air bar grid comprises openings at the main air collector bars and the primary air bars for joining a hollow passageway in the main air collector bars and the primary air bars.

13. The combustor air bar grid according to claim 12, wherein the openings are arranged at overlapping locations at the primary air bars and the main air collector bars.

14. A fluidized bed reactor comprising a furnace having a combustor air bar grid, the combustor air bar grid comprising:
    at least two main air collector bars in fluid communication with a source of fluidizing gas;
    a plurality of primary air bars that are transverse to the main air collector bars and arranged on the at least two main air collector bars such that the main air collector bars support the plurality of primary air bars, the plurality of primary air bars being in fluid communication with at least two of the main air collector bars, and the main air collector bars and the primary air bars defining ash removal openings in the air bar grid;
    a plurality of fluidizing nozzles arranged to each of the primary air bars for fluidizing the bed reactor; and
    a number of ash hoppers arranged beneath the ash removal openings,
    wherein the main air collector bars are configured to form external air-cooled walls for the ash hoppers that are cooled with the pressurized fluidizing gas.

15. The fluidized bed reactor according to claim 14, wherein the main air collector bars are in fluid communication with the primary air bars via fluidizing gas transmitting openings formed in an upper side of each collector bar and in a bottom side of each primary air bar that overlap with each other.

16. The fluidized bed reactor according to claim 14, further comprising a number of support beams or support bars arranged to support the main air collector bars, of which vertical support beams or bars are arranged directly below the main air collector bars.

17. The fluidized bed reactor according to claim 16, further comprising an essentially horizontal frame structure.

18. The fluidized bed reactor according to claim 14, wherein the ash hoppers have upper parts that are laterally aligned with and in mechanical contact with the main air collector bars.

19. The fluidized bed reactor according to claim 14, wherein the main air collector bars are connected to boiler pressure parts by using at least one expansion joint.

20. The fluidized bed reactor according to claim 14, wherein the at least two main air collector bars and the plurality of the primary air bars are hollow beams of metal, forming conduits for the fluidizing gas.

21. The fluidized bed reactor according to claim 14, wherein the main air collector bars and the primary air bars comprise a hollow passageway for the pressurized fluidizing gas.

22. The fluidized bed reactor according to claim 14, wherein the combustor air bar grid is constructed as a modular combustor air bar grid comprising a number of modules, such that, in the modules, the main air collector bars have a length allowed for normal rail or road transport, or for an abnormal or an oversize load, between 2.5 and 4 meters.

23. The fluidized bed reactor according to claim 22, wherein the main air collector bars comprise segments composed of modules joined together by welding.

24. The fluidized bed reactor according to claim 23, wherein each of the modules has a length allowed for normal road transport, or for an abnormal or an oversize load, between 2.50 and 3.50 meters.

25. The fluidized bed reactor according to claim 24, wherein the combustor air bar grid comprises openings at the main air collector bars and the primary air bars for joining a hollow passageway in the main air collector bars and the primary air bars.

26. The fluidized bed reactor according to claim 25, wherein the openings are arranged at overlapping locations at the primary air bars and the main air collector bars.

* * * * *